(12) United States Patent
Aravamudham

(10) Patent No.: US 11,205,217 B2
(45) Date of Patent: Dec. 21, 2021

(54) PRODUCT LOCATION SYSTEM

(71) Applicant: Columbia Insurance Company, Omaha, NE (US)

(72) Inventor: Praveen Aravamudham, Greenwich, CT (US)

(73) Assignee: COLUMBIA INSURANCE COMPANY, Omaha, NE (US)

( * ) Notice: Subject to any disclaimer, the term of this patent is extended or adjusted under 35 U.S.C. 154(b) by 125 days.

(21) Appl. No.: 16/208,741

(22) Filed: Dec. 4, 2018

(65) Prior Publication Data

US 2020/0175574 A1 Jun. 4, 2020

(51) Int. Cl.
*G06Q 30/06* (2012.01)
*G06F 16/9537* (2019.01)

(52) U.S. Cl.
CPC ..... *G06Q 30/0639* (2013.01); *G06F 16/9537* (2019.01)

(58) Field of Classification Search
CPC ................. G06Q 30/0601–0645; G06Q 30/80
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 5,918,211 A * | 6/1999 | Sloane | ................... | G06Q 20/20 705/14.27 |
| 6,343,276 B1 * | 1/2002 | Barnett | ................ | G06Q 10/087 705/28 |
| 7,146,243 B2 * | 12/2006 | Glynn | ................... | G06Q 30/06 700/215 |
| 7,292,678 B2 * | 11/2007 | Glynn | ................... | G06Q 10/06 379/88.04 |
| 8,401,914 B1 * | 3/2013 | Kim | ................... | G06Q 30/0641 705/26.1 |
| 8,639,587 B1 * | 1/2014 | Whang | .............. | G06Q 30/0633 705/26.5 |
| 9,047,633 B2 * | 6/2015 | Gershon | ............ | G06Q 30/0639 |

(Continued)

OTHER PUBLICATIONS

Reid, K., et al., "A case study: reducing the cost per order and improving productivity within a chemicals distribution center—Part 2", JCT CoatingsTech 2.14: 54(4). American Coatings Association, Mar. 2005. (Year: 2005).*

(Continued)

*Primary Examiner* — Nicholas D Rosen
(74) *Attorney, Agent, or Firm* — IP Attorneys Group, LLC; David Chen

(57) ABSTRACT

A Product location system and method for storing and locating products within an establishment, comprising three main components: a data server, a location updating device, and a searching device. The data server stores the information associated with the products of the establishment and communicates with the location updating and searching devices, the location updating device associates identifying information of a product with identifying information of the location where the product is currently located, and the searching device accepts user parameters and gives a search result comprising all of the products which fall within the given parameters. The searching device also helps guide the user to the location of the product.

21 Claims, 7 Drawing Sheets

(56) References Cited

U.S. PATENT DOCUMENTS

| | | | | |
|---|---|---|---|---|
| 9,767,430 | B2* | 9/2017 | Schwartz | G06Q 30/0281 |
| 9,984,357 | B2* | 5/2018 | Schwartz | G06Q 30/0641 |
| 10,423,998 | B2* | 9/2019 | Ming | G06Q 10/087 |
| 10,467,587 | B2* | 11/2019 | Bogolea | G05D 1/0282 |
| 2004/0228456 | A1* | 11/2004 | Glynn | G06Q 10/087 |
| | | | | 379/88.01 |
| 2004/0238629 | A1* | 12/2004 | Buchholz | G06Q 20/343 |
| | | | | 235/383 |
| 2005/0090931 | A1* | 4/2005 | Glynn | G06Q 30/06 |
| | | | | 700/215 |
| 2012/0232693 | A1* | 9/2012 | Allinson | G07F 17/0092 |
| | | | | 700/237 |
| 2012/0271712 | A1* | 10/2012 | Katzin | G07G 1/0036 |
| | | | | 705/14.51 |
| 2014/0052584 | A1* | 2/2014 | Gershon | G06Q 30/0627 |
| | | | | 705/26.63 |
| 2015/0134403 | A1* | 5/2015 | Schwartz | G06Q 30/0623 |
| | | | | 705/7.29 |
| 2015/0221010 | A1* | 8/2015 | Ming | G06Q 10/087 |
| | | | | 705/26.61 |
| 2016/0223339 | A1* | 8/2016 | Pellow | G06Q 30/0639 |
| 2016/0328767 | A1* | 11/2016 | Bonner | G06K 7/10861 |
| 2016/0350708 | A1* | 12/2016 | Jones | G06Q 10/087 |
| 2017/0308848 | A1* | 10/2017 | Schwartz | G06Q 30/0281 |
| 2017/0337508 | A1* | 11/2017 | Bogolea | G06K 9/6201 |
| 2018/0053232 | A1* | 2/2018 | Kauffman | G06K 7/1413 |
| 2018/0268472 | A1* | 9/2018 | Vilcovsky | G06N 5/047 |
| 2018/0357236 | A1* | 12/2018 | Bundrage | H04L 67/18 |
| 2019/0236686 | A1* | 8/2019 | Thompson | G06Q 30/0631 |

OTHER PUBLICATIONS

Jayaraman, R., et al., "An Exploratory Pilot Study on Supply Chain Data Standards in a Hospital Pharmacy," Engineering Management Journal, vol. 27, No. 3, pp. 141-151, Sep. 2015. (Year: 2015).*

Anon., "Announcing: CTUIT Softwares On The Fly Version 3.0," ICT Monitor Worldwide (Amman) Sep. 28, 2016. (Year: 2016).*

* cited by examiner

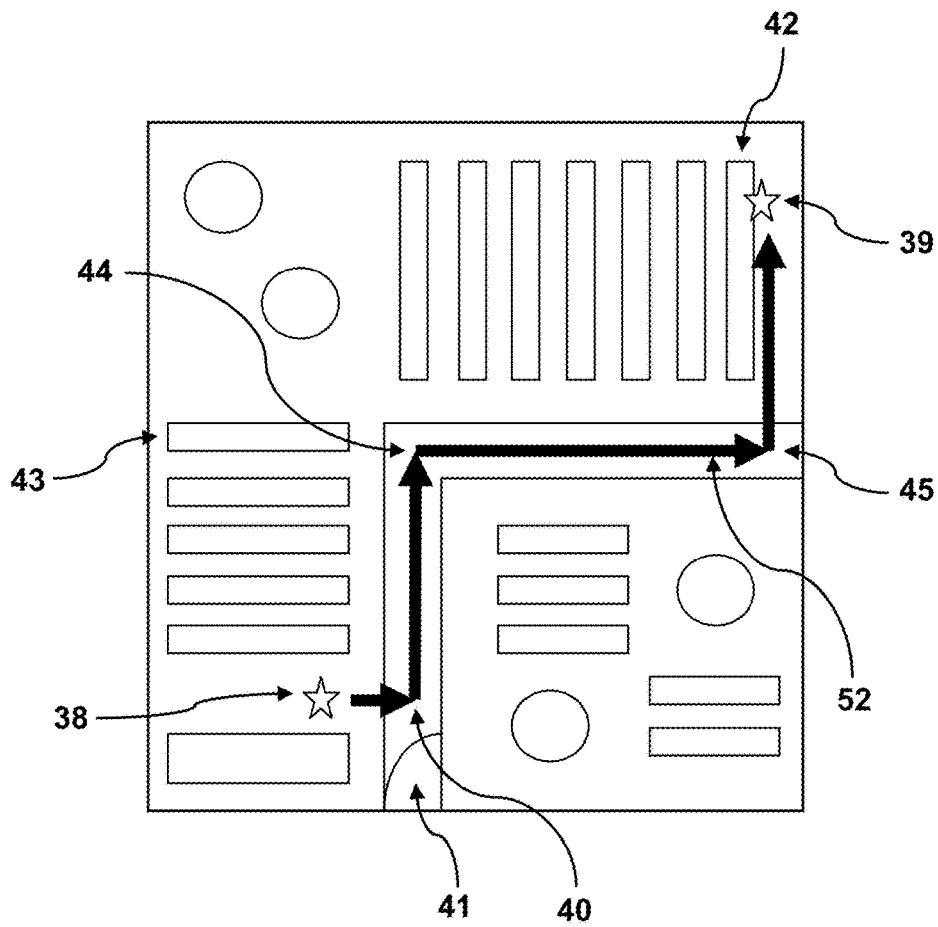

PRODUCT LOCATION SYSTEM

TECHNICAL FIELD

The invention relates to a system and method for storing and locating products within an establishment.

BACKGROUND OF THE INVENTION

Typically, when a consumer needs to find an item in a store they either have to wander around the store potentially using signage or other information which may help guide the user to the correct location, or they have to ask an employee of the store. The former option wastes valuable time of the consumer and potentially frustrates the consumer to the point where the consumer gives up and does not purchase the product, leading to a decrease in revenue for the store. The latter option requires employees to be readily available for the consumer and detracts from the task they were doing, which results in a loss of productivity for the employee.

Some stores or other establishments have attempted to mediate this situation by using customer service kiosks or other similar searching products which can be used by a customer. These customer service kiosks or other searching products often list the location of products along with other identifying information. However, typically these kiosks for searching products require the user to know exactly what specific item they are searching for and often do not give the ability to generally search for all items which would fall under specific categories. This can be problematic for users who may not be familiar with the items they are looking for, or may limit the ability of the store to interest the consumer in similar products.

These kiosks for searching products are often not updated in real-time so a consumer could search for an item only to discover when arriving at the product's location that the product is out of stock. Typically the user has no way of tracking the stock of the item or placing it on hold via the kiosk for searching products, which limits the customer's confidence that the product will be available for them to purchase. What this often leads to is the customers calling the establishment to have an employee check on the stock or manually hold the item, which again detracts from the employee's task.

While some of the kiosks or searching products give the user an image of the map of the store with the product location, consumers unfamiliar with the store often have trouble locating the product with simply an image. This is compounded by the fact that typically the kiosk is located in a static location so the consumer must either remember the image of the map or take a picture of it to refer back to at a later point, further complicating their efforts. Other kiosks give the aisle location, which again, finding the location of the aisle alone can be difficult for one unfamiliar with the location, however, this is additionally difficult as now the consumer has to figure out where on the isle the products is located.

After finding the desired product, consumers then must find the cash registers and wait in line to purchase their items. Especially when busy, or when those in line in front of the customer have an excess of items, this process can be time consuming and tedious. When the consumer only has a few or even one item this irritation is compounded. Some establishments have tried to mediate this by using "self-check out" registers, however, these often have issues and still require the consumer to be dependent on the technical acumen of those in front of them in line. What would be ideal is if the customer could purchase the item directly from the searching application after being guided to the desired product.

Often these kiosks or other searching devices use older, outdated means of communicating with a central server which slows down the search time and is overall an inefficient means of communicating between devices.

On the other side of the situation discussed above are the employees of the stores whose valuable time is wasted by helping customers find products within the store. This can be compounded for newer employees who may not know the location of all the products in the store yet, so they have to find a second employee which increases the time spent by the employees by two.

Often keeping track of inventory requires manually checking the status of the shelves or individually scanning each item which updates a central server. Both of these methods are time consuming and can discourage moving items around in order to feature promotional or seasonal items, which can decrease revenue or interest in these products. In addition, without a tracking system in place, when items are moved, the employees could inadvertently direct a customer to the old location of the product, aggravating the customer. Or they could look for the item in the old location themselves, wasting time on something which could be easily avoided with a system that stored and updated the location information of the products in the store.

SUMMARY OF THE INVENTION

The object of the present invention is thus to provide a product location system which overcomes the limitations discussed above and aids both the consumer as well as the employee locate and keep track of products in the establishment. The present invention comprises a data server for storing product information, a location updating device which correlates an identifier on a product with an attribute in the establishment which denotes its location within the establishment, and a searching device which helps the user of the device find their desired products as well as helps the user find the location of the desired products.

In some embodiments the location of the product within the store is given to the user of the searching device, in other embodiments a map is given, and in other embodiments the searching device helps guide the user to a selected product. In some embodiments this guiding is via a map of the store with a path from the searching device to the desired product overlaid over the map, in other embodiments this guiding is stepwise directions from the searching device to the desired product, and in other embodiments augmented reality is used to guide in real time the user of the searching device from their current location to the location of the desired product. In some embodiments the searching device allows the user to purchase their desired products.

In some embodiments the searching device filters products via a variety of step-wise filters, and in other embodiments a general search bar is used. In some embodiments, after searching for a product the user can reserve the product at a selected establishment. In some embodiments, the user of the searching device is required to sign-in to the device as a means of tracking purchase and search history in order to better recommend products for the user.

In some embodiments the product location device uses stateless architecture to communicate between the components. In some embodiments the data server is two separate components, one for temporary data storage and a second for long term data storage. In some embodiments the location updating device and the searching device are combined in a single device.

In some embodiments barcodes are set up around the store whose values denote the different locations around the establishment. Similarly, in some embodiments the barcode values of the products are the identifiers used to keep track of the products.

BRIEF DESCRIPTION OF DRAWINGS

FIGS. 5a, 5b, and 5c show different embodiments of the guidance system of the product location system of FIG. 1.

DETAILED DESCRIPTION

This invention relates to a system and method for locating products in an establishment. In this patent, establishment can be a store, a house, a business, or any other such place where different products or goods are stored and accessed by individuals. Identical elements in the various Figures are numbered identically throughout.

Figure 1:
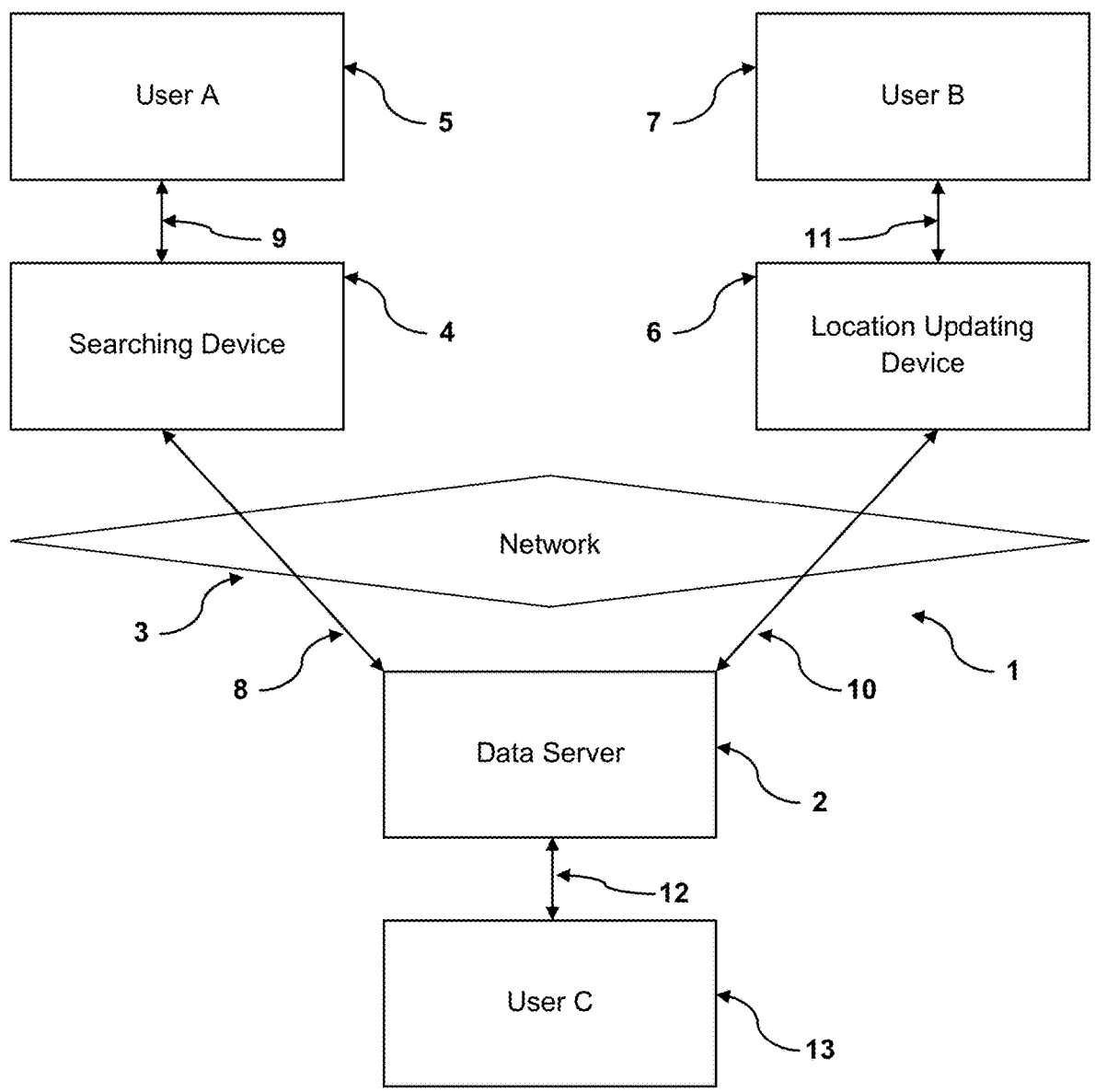
FIG. 1 is a block diagram of the product location system.

As shown in FIG. 1, in one embodiment of the invention the product location system (1) consists of six major components, a data server (2), a searching device (4), a location updating device (6), and users A, B, and C (5, 7, and 13) for interacting (9, 11, and 12) with the respective devices. In some embodiments the users (5, 7, and 13) are human and in other embodiments one or more of the users (5, 7, and 13) are robotic equipment or the like. The different devices 4 and 6 are connected to or interact with (8 and 10) data server 2 via a network (3). In some embodiments network 3 is a local connection, such as a Local Area Network (LAN), and which is only accessible within the closed network of the establishment. In some embodiments the network is expanded to a Wide Area Network (WAN). In other embodiments network 3 is a general internet connection and is accessible worldwide. In some embodiments Virtual Private Networks, which allows the transfer of data from a remote computer as if it was on the local network, Secure Shell connections, or other means of securely or insecurely sharing data are used in conjunction with general network 3.

Data server 2 stores or hosts all of the product information such as size, location, price, color, stock, material, and the like. In some embodiments, this data is stored using JavaScript Object Notation (JSON) format, in other embodiments Extensible Markup Language (XML) format, in other embodiments Comma Separated Value (CSV) format, in other embodiments Hypertext Markup Language (HTML) format, in other embodiments HyperText Transfer Protocol (HTTP) format, in other embodiments Simple Mail Transfer Protocol (SMTP) format, in other embodiments YAML Ain't Markup Language (YAML) format, and in other embodiments Structured Query Language (SQL) format. Other similar or well known data storage and transfer formats are also acceptable.

In some embodiments, data server 2 and devices 4 and 6 communicate (8 and 10) using stateless systems. These stateless systems, such as Representational State Transfer (REST), have the benefits of having a separated client and server relationship, allowing each component to be modified independent of one another. In addition, the stateless communication speeds up communication as no prior communication context is required to be stored and read before subsequent communications. In other embodiments Simple Object Access Protocol (SOAP) systems are used. SOAP has the benefit of having higher security with the drawback of longer times and greater bandwidth usage for server-client communication. In other embodiments the GraphQL system is used. GraphQL allows for faster communication as it allows the user to query only for what is specifically requested and reduces the number of queries necessary from client to server. These updated communication techniques allow for faster and more efficient communication between server 2 and devices 4 and 6 in comparison to some of the prior art.

The different languages and communication methods are essential to give establishments flexibility in the setup of product location system 1. Some establishments already have data servers or data server type systems with product information already stored on it. Because of this, in some embodiments devices 4 and 6 must be configured to interact with these established data server systems, and thus must use languages or architecture which match the established data server system. In other embodiments, all of the components can be newly added together.

In some embodiments data server 2 is located in the establishment and only comprises data specific to that establishment. This embodiment is useful for smaller establishments which are not connected to other establishments in the area or worldwide. These embodiments can offer greater security if data server 2 is only accessible within the establishment. In other embodiments data server 2 comprises data for multiple different establishments and is accessed remotely by the different establishments. This embodiment is useful for interconnected establishments or a larger company with multiple establishments in a given area or worldwide.

In some embodiments data server 2 comprises two components, the first for storing short term product information and the second for long term storage of the entire product database. In some embodiments these two components communicate by using a JSON Web Token medium. In some embodiments these two components are both stored in the same establishment and in other embodiments they are stored in different establishments. Having two different components for data server 2 is useful as the temporary storage component could be put on a higher bandwidth network, or it could be a smaller but faster storage device and thus be better suited for the daily rapid communication with devices 4 and 6. In contrast, the long term storage component can be a larger but slower storage device which can communicate with the temporary storage component at a slower rate after the establishment closes. In other embodiments the short term storage component is located within the establishment where the majority of communication between device 4 and 6 occur, and the long term storage component is located in a central facility which houses data for many different establishments or is placed under greater security.

In some embodiments, information in data server 2 can be directly accessed (12) by user C (13). In some embodiments this direct access is by the managers or owners of the establishment and allows for access to more information about the items such as how much the establishment purchased the item for, where the product was purchased from, and other such information that a typical user or customer should not have access. In some embodiments user C (13) can only view the information in order to avoid accidentally changing essential information. In other embodiments, user C (13) can view and modify information in order to manually update or add products if necessary. In some embodiments this direct access is via a computer acting as data server 2 and which has the information stored on it. In other embodiments the direct access is via a computer connected in some means to data server 2. This connection could be a local or internet connection as discussed above.

Figure 2:
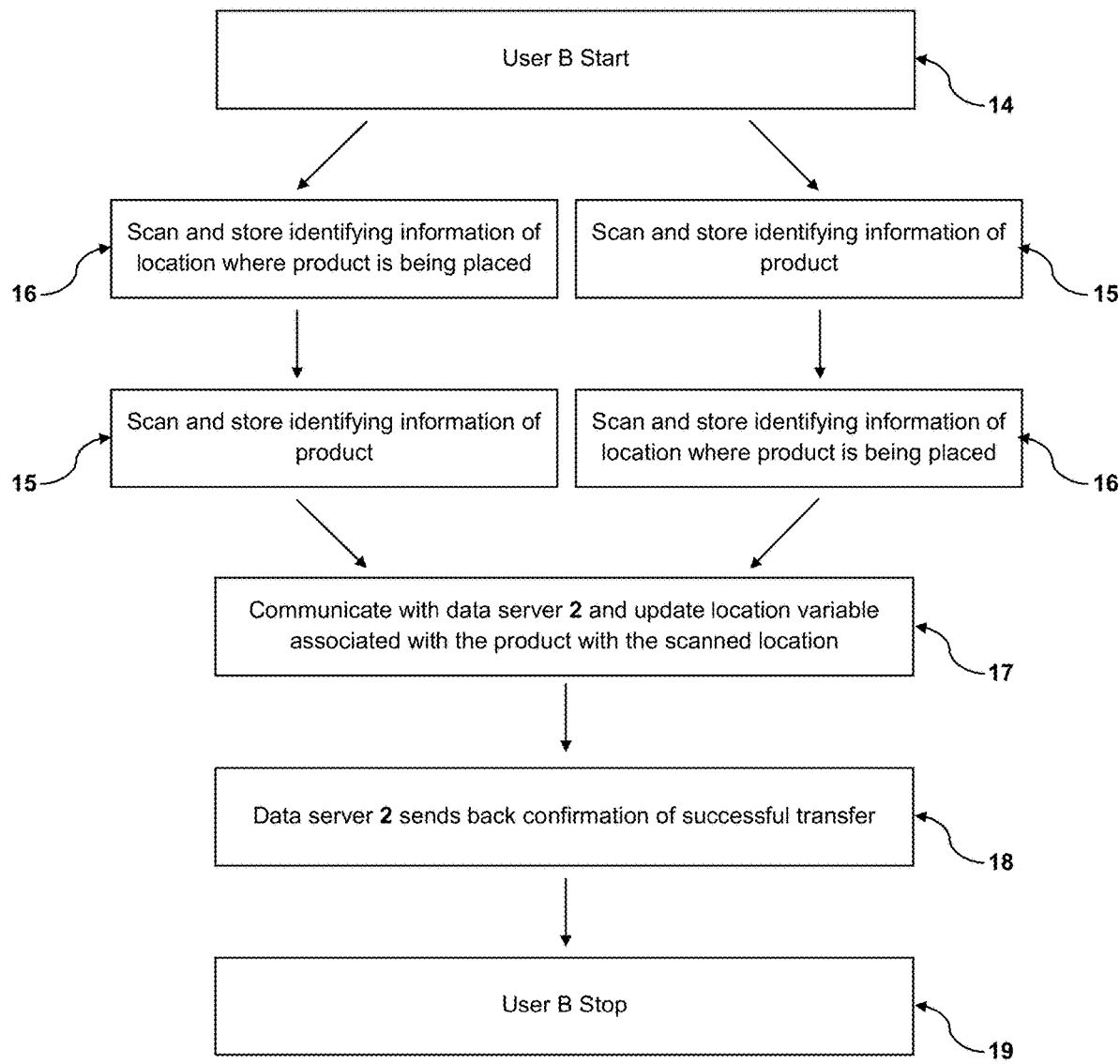
FIG. 2 is a flow chart showing an embodiment of the functions performed by the location updating device of the product location system of FIG. 1.

Location updating device 6 in most embodiments is the main way the location of a product is modified. This is completed through device 6 communicating (10) with data server 2 and updating the location information tied to the product in question. FIG. 2 shows a flow chart indicating how an embodiment of the invention modifies the location of a product. For this embodiment, user B (7) will either first scan the identifying information of the product(s) (15) and then scan the identifying information of the location where the product(s) are being placed (16), or will first scan the identifying information of the location where the product(s) are being placed (16) and then scan the identifying information of the product(s) (15). Scanning the location information first is useful when multiple products are going to the same location, such as the stockroom, while scanning the product information first is useful when putting the products around the establishment. When finished scanning, device 6 will communicate with data server 2 and will instruct the server to update the location information variable associated with the scanned product(s) with the scanned location information (17). If successful, data server 2 will communicate back to device 6 to indicate the update was successful (18).

In some embodiments, device 6 is a separate scanning device connected to a computer, smart phone, or other similar electronic device, in other embodiments device 6 is imbedded into the computer, smart phone, or similar electronic device. In some embodiments, information is accessed on device 6 via a physical keyboard and mouse, in other embodiments a digital keyboard and touch screen device, and in other embodiments the user has the option to use either the touch screen and digital keyboard or physical keyboard and mouse.

In some embodiments, when the identifying information of the product or location is scanned, device 6 will check whether the scanned identifying information variable is valid. In some embodiments which check for invalid identifying information variable(s), device 6 will notify user B that the identifying information variable is invalid and user B can attempt to re-enter the variable or correct the error. In some embodiments an invalid identifying information variable is any variable that is not stored on data server 2. In these embodiments, user(s) will have the option to input this new identifying information variable into data server 2. In some embodiments only certain user Cs will have the ability to input new information, in some embodiments only certain user Bs will have the ability to input new information, and in other embodiments both certain users B and C will have the ability to input new information. Specifying which user(s) can add new information is important as newer employees of a store should not be able to add information before going through proper training, thus the owner may want to only allow managers or long-time employees access to that ability. In other embodiments an invalid identifying information variable is a product identifying information variable that is forbidden to be matched with a location identifying information variable, such as trying to locate ice-cream in a non-freezer section.

In some embodiments each product's identifying information must be individually scanned, which allows for different units of the same product to be placed in different locations in the establishment. This is commonly done in stores to in order to display a small portion of the products which are on sale or have other significance near the front of the store with the most foot-traffic, while keeping a majority of the stock on the original shelf. In other embodiments user B can group multiple products during a scan so that during subsequent scans only one product within the group needs to be scanned and the location will be updated for all of the products within that group. In other embodiments, products can be pre-grouped such that the products do not have to be individually scanned and grouped by user B. In some embodiments this grouping is completed by user C (13) during purchasing, and in other embodiments by user C via direct access to data server 2. Grouping products saves significant amounts of time as user B no longer has to scan each individual product as they are placed in their location in the establishment. This grouping technique greatly improves this technology in comparison to the prior art and facilitates a more efficient and expedited workflow process.

In some embodiments device 6 uses a barcode or Quick Response (QR) code reader. For the purpose of this invention barcode and QR code will be used interchangeably. In some embodiments the barcode scanner uses laser technology to read the barcode and in other embodiments the code is read digitally using an optical camera. In this embodiment barcodes are placed in different locations around the store and each barcode's value is associated with the location of the barcode label.

In some embodiments device 6 captures an image of the product and location and uses image learning software to identify the necessary product or location information.

In some embodiments, device 6 has access to a keyboard, and user B manually enters the identifying information. In some embodiments the keyboard is physical and in other embodiments the keyboard is virtual. In some embodiments, the keyboard is a feature added in addition to the barcode or other scanner type discussed above. These embodiments are useful for times when the barcode may be damaged or otherwise is unable to be properly read by the scanner.

In some embodiments the location information is a location variable specific to the given establishment. An example of an establishment specific variable would be cabinet 1 of row 4 on aisle 5. In other embodiments the location is a general location variable. An example of a general location variable is coordinates of latitude and longitude.

In some embodiments, device 6 stores the scanned locations and products but does not communicate with the data server until a later specified time. This embodiment is useful as it allows user B to continue working even if connection with the data server 2 is lost due to an error or maintenance. In these embodiments, when not connected to data server 2, device 6 will notify user B that they are working in "off-line" mode and that they are not connected to data server 2. Even if connected to data server 2, in some embodiments device 6 will still only communicate with data server 2 at certain time points, such as after business hours. In some of these embodiments, the information stored on data server 2 is mirrored in device 6, which allows device 6 to check for invalid identifying information without communicating with data server 2, and in other embodiments only the information scanned between communications is stored on device 6 which allows for a smaller device with less storage capacity.

In some embodiments device 6 requires a login in order to use for security purposes. This prevents a random individual from having access to device 6 and potentially deleting or modifying important location information unwittingly or maliciously. In these embodiments, user C (or the manager of data server 2) can set and modify a specific amount of time for timeout of the user B session due to inactivity, and in other embodiments a specific time limit is set. User B has the option to manually logout at any time. In addition to added security, the time of login and logout and what user B scanned during that time can also help managers or owners track user B productivity, the times when user B started and stopped work, etc. In some embodiments each user B, identified by their login information, can be customized as to the specific data they are allowed to modify. This allows for customization of what abilities the different user Bs have within device 6. As discussed above, some user Bs may be newer employees or employees which should not have the ability to modify certain information, such as adding new location variables or grouping/ungrouping items, while other user Bs, such as managers, should have these abilities. In these embodiments with user B login, user C (or the manager of data server 2) has the ability to add and delete user Bs as well as modify user Bs access as necessary.

In some embodiments the login information is a user generated username and password, in other embodiments the login information is a randomly generated username and password, and in other embodiments the login information is a user generated username and a randomly generated password. In some embodiments where the user generates their own password, any password, or even the absence of a password, is acceptable. In other embodiments, user C (or the manager of data server 2) can define specific requirements for the password, and in other embodiments a standard set of password requirements is pre-loaded onto the software. In some embodiments these password requirements are at least one capital letter, lowercase letter, special character, and number. In other embodiments only a subset of these requirements are necessary. In some embodiments forgotten passwords can be reset by sending a temporary link to the user's personal device, such as a cell phone or email address (personal or work-issued). In some embodiments the supplied link will direct to a website which allows the user to reset their own password, and in other embodiments the link will direct to a webpage which will randomly generate a new password for the user. In other embodiments forgotten passwords can only be reset by user C (or the manager of data server 2).

In some embodiments device 6 also searches and gives information based on the input. If user B inputs a location, device 6 will return all items which were last recorded at that location. If user B inputs a product code, device 6 will return the last recorded location of that product. This will help the user B correctly replace a product they find randomly around the establishment, or know what products should be in an empty or disorganized location in the establishment. In some embodiments when a product is scanned, user B also has the option to see where other similar products are located. This will help user B see if there is more of the item in another location, such as the stock room.

In some embodiments, instead of scanning a specific location, device 6 can be set to give all products scanned the same location unless otherwise instructed. This is useful at locations such as the cash register where most of the products will be marked as location "sold" or "not applicable" or other similar terms, or for locations such as the stock room where large quantities of items are unpacked and initially stored.

In some embodiments device 6 is not directly activated but is in a constant monitoring state. In one embodiment a multitude of scanners are installed around the locations of the establishment, one scanner per location. As an individual, whether the individual is a customer, user, etc., places a product on or takes a product out of a given location, the product will be scanned and automatically removed from or added to the location. In this way, even if a customer takes a product and then later puts it in a different location, the location of the product will be automatically updated and can be found with a search by users A, B, or C using device 4, 6, or data server 2, respectively. In another embodiment, cameras are set up around the establishment which detect the movement of products from one location to another and update their location in data server 2 as the products are placed around the establishment. In these embodiments a location such as "customer" or "transit" or other similar terms denotes that an individual is currently carrying around the product.

Figure 3:
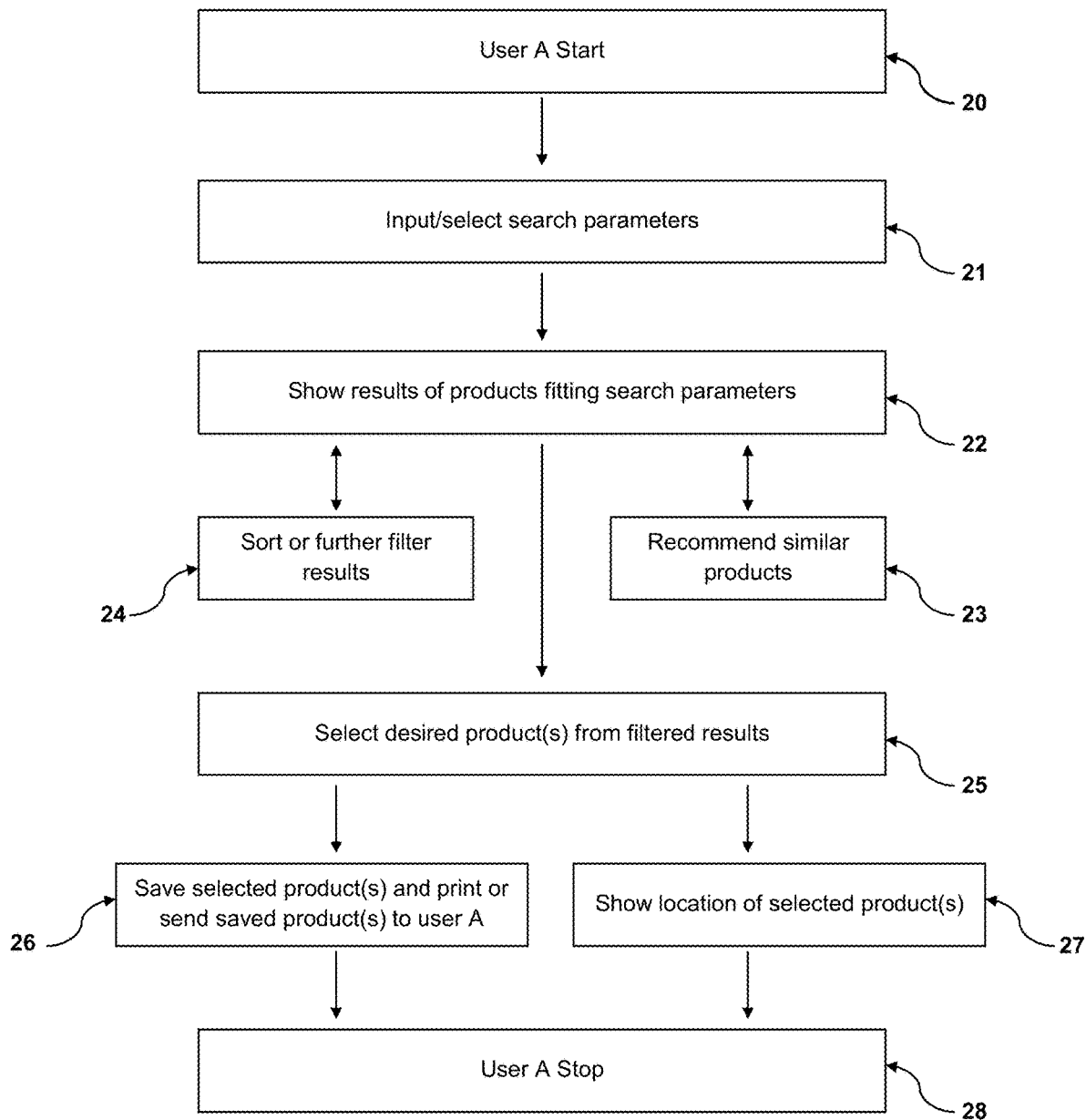
FIG. 3 is a flow chart showing an embodiment of the functions performed by the searching device of the product location system of FIG. 1.

The third main component of product location system 1 is searching device 4 which allows user A (5) to search for a product. FIG. 3 shows a flowchart indicating how an embodiment of the invention helps user A find their desired products. User A will first input their desired search parameters (21). Using the input parameters device 4 will show the results of the search to user A (22). While looking at the search results user A can optionally sort or further filter the results (24) which will update the search results (22) in a cyclic fashion. In some embodiments, when viewing results, device 4 recommends other products (23). After looking through the results, user A will select the product(s) they are interested in (25), and then has the option of saving the selected product(s) and either printing or sending the results to user A's contact information (26). In some embodiments device 4 has the option of showing user A the location of the product(s) in the store (27). Each of these steps will be discussed in more detail below.

In some embodiments, information is accessed on device 4 via a physical keyboard and mouse, in other embodiments via a digital keyboard and touch screen device, and in other embodiments the user has the option to use either the touch screen and digital keyboard or physical keyboard and mouse.

In some embodiments device 4 comprises an application on a unit which is owned and maintained within the establishment, such as a kiosk or an in-establishment computer. In other embodiments device 4 comprises an application installed on user A's personal device, such as a personal computer or cell phone.

In some embodiments device 4 must be initialized in order to access the functionality of device 4. In some embodiments user A must sign into an account, in some embodiments user A has the option of signing into an account or continuing as a "guest" user. Having a guest option is essential since signing into an account requires user A to submit some personal information which they may be unwilling or unable to accomplish. In some embodiments user A can sign in with a username and password. In some embodiments the username is their email, in other embodiments the username is a membership number, and in other embodiments is a user generated term. As with device 6 in some embodiments passwords are created by users and in other embodiments passwords are created randomly, and these passwords in some embodiments have character requirements, and in other embodiments do not have character requirements. Similarly, in some embodiments forgotten passwords can be reset by sending a temporary link to the user's personal device, such as a cell phone or email address. In some embodiments the supplied link will direct to a website which allows the user to reset their own password, and in other embodiments the link will direct to a webpage which will randomly generate a new password for the user. In other embodiments forgotten passwords can only be reset by user C (or the manager of data server 2).

In other embodiments user A signs in by scanning or otherwise entering a physical or digital membership card. In other embodiments user A scans or otherwise enters a credit card associated with their account. In some embodiments when user A uses a membership card or number, device 4 will sync the purchases made on the card with the search user A performed as a means of better recommending further products and personalizing subsequent searches. Thus, using device 4 while signed in with an account is beneficial as it allows better recommendations of products and gives a more tailored and specific searching experience.

In embodiments where user A signs in, user A will have the option to sign out and return to the main screen. In some embodiments user A can set and modify a specific amount of time for timeout of their session due to inactivity and in some embodiments device 4 will automatically sign a user A out after a given amount of time. This functionality is important especially when device 4 is located in the establishment, in order to prevent others from viewing user A's personal information.

The main functions of device 4 are filtering products based on user input and guiding user A to selected products. In some embodiments a general search bar is used where user A types in keywords or phrases for the product they are looking for and device 4 displays all products which have descriptors matching the searched term(s). In some embodiments an implicit "and" is added between terms, and in other embodiments an implicit "or" is added between terms. For example, if user A searches for 'black jeans', in embodiments with an implicit "and," device 4 will return all jeans which are also black, but in embodiments with an implicit "or" device 4 will return all jeans as well as all black products. In other embodiments user A has an advanced option which allows user A the option of specifying which grouping term (and/or) is added between search terms. In some embodiments the general search bar and the filtration method discussed below are used in combination. This embodiment is useful for completing general searches for an item with the search bar and further refining with filtration tools after the initial search.

In some embodiments device 4 is equipped with a barcode scanner and searching can be completed by scanning the barcode of a specific product. In other embodiments device 4 is equipped with an image reader which can identify a specific product. In this way a user A who finds a misplaced item or a display item that may not be in their size can scan the item and find out more information about it.

Figure 4A:
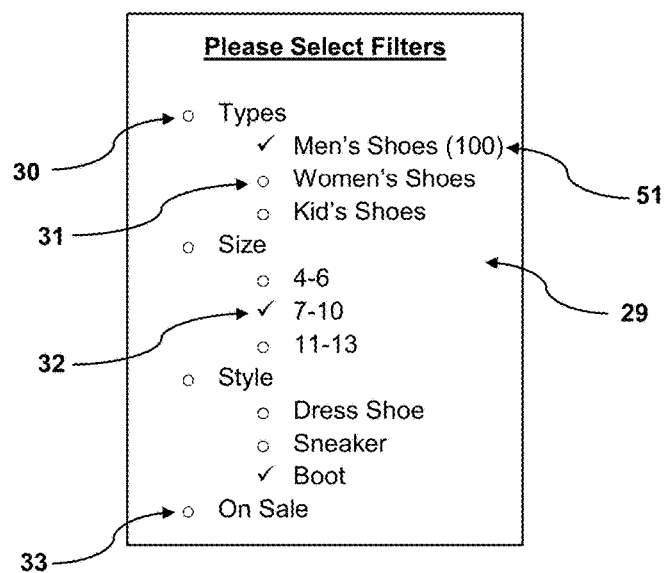
FIGS. 4a and 4b show different embodiments of the filtration system of the product location system of FIG. 1.
Figure 4B:
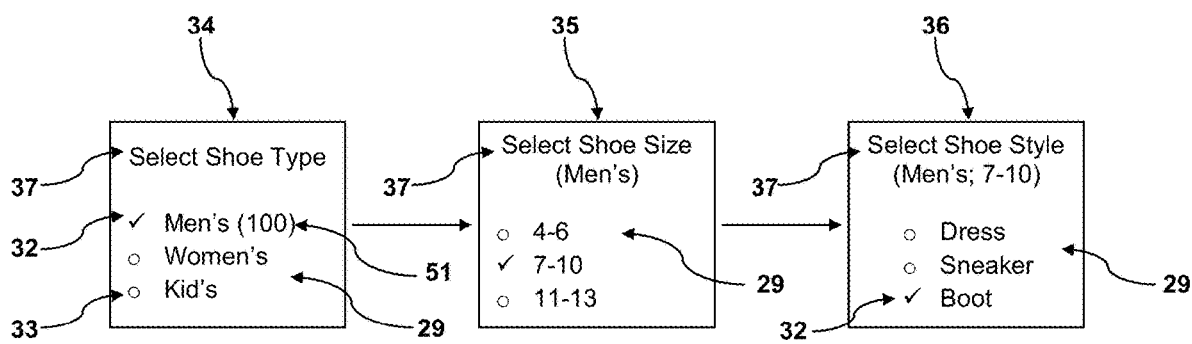

In other embodiments user A will select pre-defined filters as a means of finding their desired product. In some embodiments all filters are accessible (FIG. 4*a*), and in other embodiments the different filters are only accessible in a step-wise fashion (FIG. 4*b*). FIGS. 4*a* and 4*b* show a comparison of these two filtering techniques which will lead to the same results. FIG. 4*a* shows an example embodiment in which all filters (29) are accessible, and FIG. 4*b* shows an example where the same filters are shown in a step-wise fashion.

As seen in FIG. 4*a*, for embodiments with all filters accessible, filters 29 can be grouped (30), where selecting the parent also selects (32) all sub-filters (31), or filters 29 can be individual (33), where selection of the filter only selects one filter. Sub-filters 31 (unless they have further sub-filters under them) act as individual filter 33. In some of these embodiments, user A must select all desired filters 29 and then instruct device 4 to search and return results, and changing the filter selection requires a new search to be completed. In other embodiments, as user A selects filters, 29 device 4 will automatically return results based on which filters 29 were applied or removed as they are being selected (32) or unselected. For the embodiment shown in FIGS. 4*a* and 4*b*, device 4 would return all shoes which have the descriptive terms of men's, boots, and sizes 7-10, as this is what user A has selected. As seen in FIG. 4*b*, where filters 29 are shown in a step-wise fashion, initially (34) user A only has the option of selecting what type of shoe (in this case Men's, Women's or Kid's). In some of these embodiments each filter 29 acts in an individual filter, with no option to select subgroups. In some embodiments user A can select (32) multiple filters 29 and in other embodiments user A can only select one filter 29. Once the selection is made the second group of filters (35) can be selected, and once selected, the third group (36), and so on as necessary. In some embodiments with a step-wise filtration system user A has options consisting of selecting filter(s), going back a filtration step, going forward a filtration step without selecting any filters in that particular step, going directly to the results page from any given filtration step, starting the entire process over again, and combinations thereof. In some embodiments both of the filtration methods discussed above and shown in FIGS. 4*a* and 4*b* are used.

Having both of these filtration embodiments is essential as different user's A will require different searching mechanisms. Individuals more familiar with the products they are searching for and what specific types of filters are required would be better suited for the embodiment shown in FIG. 4*a*. However, customers who may be less familiar would be overwhelmed with the amount of choices initially, and a stepwise filtration allows for more targeted and specific questions, and also is easier for the user to manage. As seen in FIG. 4*b*, the stepwise filtration also allows for the customization of title 37 which can help better describe the filters 29. Embodiments with both methods are useful when initial filtering in completed is desired to be completed a step-wise manner, and then further refinement of the results can be completed via the full-list filtering shown in FIG. 4*a*.

Embodiments with steps of filtration or where filtration is possible after initial searches are beneficial as they allow user A to further filter results without having to start the search over again, as is common in the prior art.

In some embodiments with filtration steps the filters will indicate how many items will be displayed when the filter is selected (51). These embodiments help user A decide how stringent their filtration methods will be if applied.

During the filtration steps, in some embodiments device 4 communicates with data server 2 before showing results in order to provide the most up-to-date information regarding stock, location, price, or other similar information. In other embodiments the product data is stored on device 4 and only updated via communication with data server 2 at specified times. In some embodiments, device 4 only communicates with data server 2 after the final products are selected (25)

in order to reduce the number of communications between device 4 and data server 2. In embodiments where device 4 has the product data stored on it, in some embodiments device 4 has the ability to work in "off-line" mode, where no communication with data server 2 is required. This is essential for times when there is an error in the connection between data server 2 and device 4 or when maintenance of data server 2 is being completed.

Figure 6:
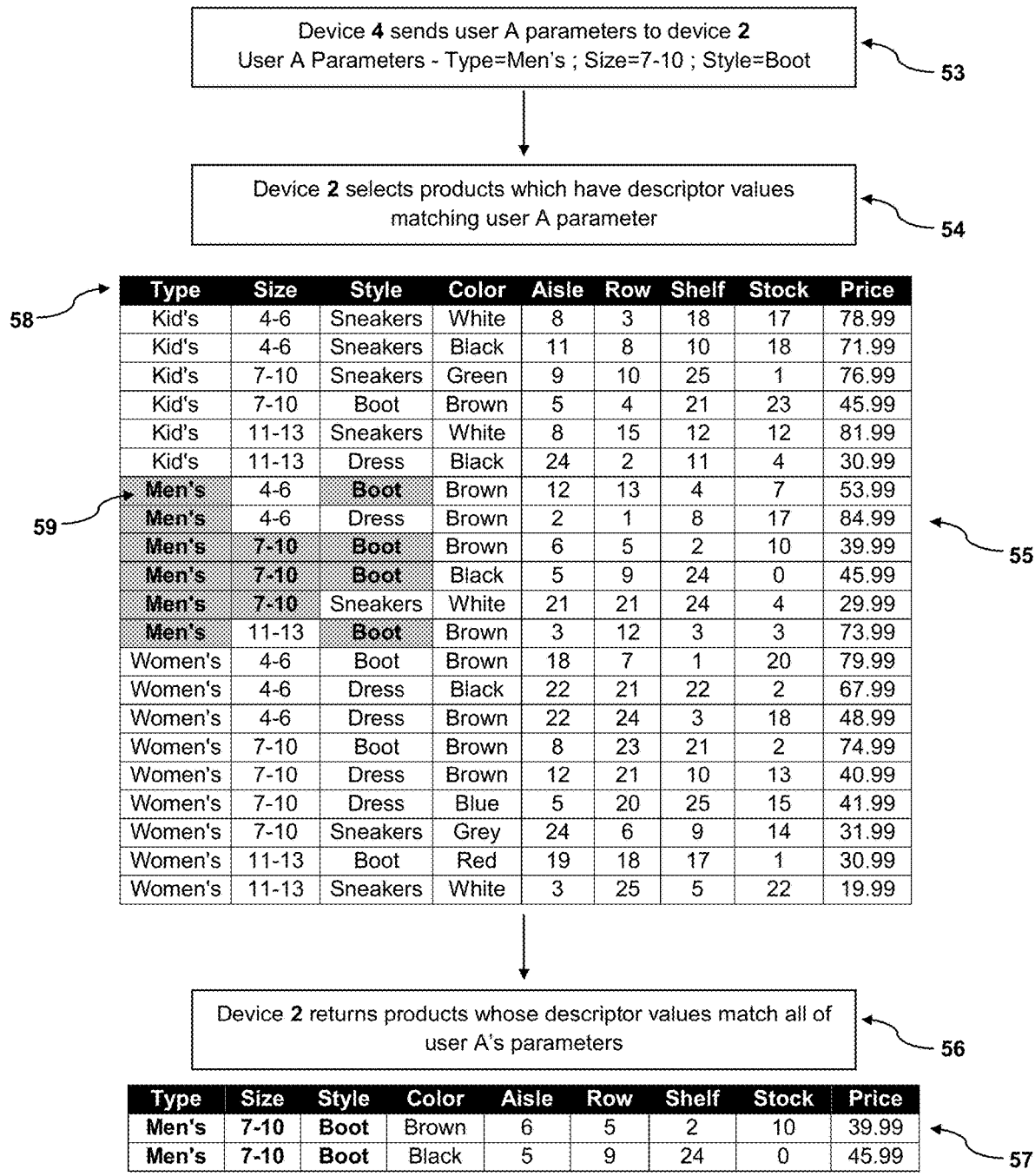
FIG. 6 is a flow chart showing an embodiment of the filtering functions of the data server the product location system of FIG. 1.

FIG. 6 shows how in some embodiments device 4 will give a search result to user A, based off of the filtering parameters user A gave in FIGS. 4*a* and 4*b*. In these embodiments device 4 will communicate with data server 2 and will request all products which have descriptor values which match the user A's input parameters (53). Data server 2 will search each descriptor which user A has selected a parameter for and find the products which have a descriptor value matching the each selected parameter (54). Table 55 shows an example of this, where table 55 contains all the products in the establishment with various descriptors (58). As seen in table 55, data server 2 has selected (59) all products whose "Type" descriptor is "Men's" based off of user A's parameter. Similarly, data server 2 has selected all products whose "Size" descriptor is "7-10" and whose "Style" descriptor is "Boot." Data server 2 will then return to device 4 all products whose descriptor values match all of user A's parameters (56). This is shown by table 57 which provides the two products whose "Type" descriptor is "Men's", whose "Size" descriptor is "7-10" and whose "Style" descriptor is "Boot."

In some embodiments all of the descriptors of that product are returned, as shown in table 57. In other embodiments user B chooses what descriptors are returned, and in other embodiments user C (or the manager of data server 2) chooses what descriptors are returned. This is important as user C may not want descriptors such as purchasing price or supplier to be visible to user A. In some embodiments if there is none of the item in stock it will not be returned to user A, and in other embodiments it will be returned (as seen in table 57). In this way the establishment can choose whether or not to show user A products not in stock, since they may want the product and thus place it on hold. However, knowing the product is not in stock could also cause them to go to a different establishment to purchase the product, along with any other products they may be purchasing, which would decrease revenue of the establishment where the search was completed.

After filtering the products, user A can look at the filtered products and selects the desired product(s) (25). In some embodiments, user A can see more information such as price, stock, size, color, model, etc. by selecting a product, and in other embodiments all pertinent information is shown in the search results. In some embodiments user A can choose what product info is shown in the search results. In some embodiments user A can only select one product and in other embodiments user A can select multiple products. After selecting the product(s) they are interested in, user A can save the desired product(s) to a list (26). In some embodiments where user A signs in, user A has the option to save the list of desired product(s) which can be accessed at a later date. In some embodiments the list is saved to a general location and is accessed by printing the list, or by sending the list to user A's contact information. In some embodiments user A's contact information includes phone number or email address. In order to save paper and ink, in some embodiments printing the list in the establishment is not an option, requiring the saving and accessing of the list to be completed digitally. In other embodiments a link or other code specific to that list to user A's contact information. In some embodiments the general location where the lists are saved is data server 2 and in other embodiments the general location is another server or computer medium separate from data server 2. In some embodiments the list is temporary and must be printed or saved by user A.

In some embodiments device 4 shows the location of the selected product(s) (27). In some embodiments the location of the product is simply the address of the establishment(s) that currently have the product in stock. In some embodiments the location of the product is a map which gives the address and a visual location of the establishment(s) that currently have the product in stock. In some embodiments device 4 guides user A to the establishment. In some embodiments this guidance is via a map with the pathway from their current location to the location of the establishment(s) that currently have the product in stock overlaid on top of the map. In other embodiments this guidance is textually using stepwise instructions which will direct user A from their current location to the location of the establishment(s) that currently have the product in stock.

In other embodiments device 4 guides user A to the last known location of the selected product(s) within a selected establishment. In some embodiments user A can select an establishment and in other embodiments the establishment is pre-selected for user A. These embodiments are important as embodiments of device 4 which are located inside of an establishment will often want results pertinent to that establishment to be favored over others. However, for embodiments of device 4 which are located outside of the establishment there could be a variety of options for user A to choose from and decide which establishment they want to visit.

Figure 5C:
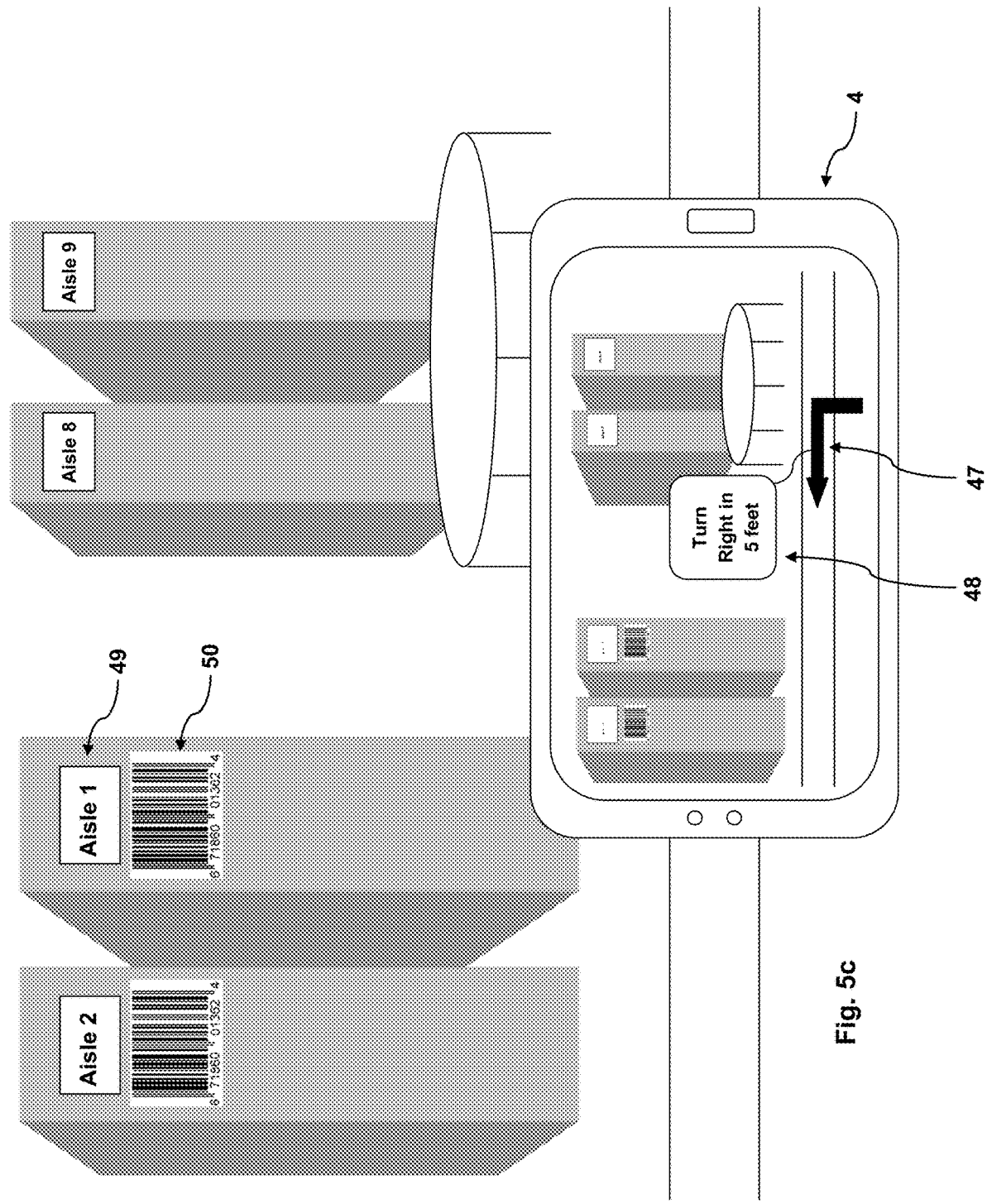

FIGS. 5*a-c* show examples of some embodiments which guide user A to the last known location of the product. In some embodiments the guidance is via a guiding line overlaid on the map of the establishment, as shown in FIG. 5*a*. FIG. 5*a* shows the solid black arrow (52) overlaid on the map of the establishment which guides the user from their current location (38) to their desired product (39) on shelf 42. In some embodiments where multiple products are selected the guiding line shows the optimal route from user A's current location to all of the selected products. In other embodiments device 4 gives textual stepwise directions from user A's current location to their desired product. FIG. 5*b* shows an example of this which gives textual directions guiding user A (38) to their desired product 39. The numbers correlate with the position of the objects seen in the establishment shown in FIG. 5*a*. As seen in the example embodiment shown in FIG. 5*b*, device 4 gives the final location of desired product 39 as well as step by step directions with approximate distances to walk and location markers regarding where to turn, etc. In some embodiments user A has the choice of visual or textual directions, and in other embodiments user A is given a combination of both visual and textual directions. These embodiments are useful as some users may favor one type of direction method over another. Additionally, stores with complex layouts may prefer a map versus a textual guidance method.

In some embodiments device 4 directs user A to their desired product using augmented reality. As seen in FIG. 5*c*, in some embodiments device 4 uses an image-capturing device to overlay directional arrows (47) on the captured image to guide user A from their current location to their desired product 39. In some embodiments verbal directions are given in pop-up text boxes (48). In other embodiments a combination of directional arrows 47 and text boxes 48 are used. As user A moves throughout the establishment, device 4 will continually update their position and give instructions on where to go in order to get to the desired product 39.

In some embodiments which guide user A to their desired product, user A has the ability to choose an alternate route. This is useful when user A wants to stop at a different part of the establishment first, or if a given area of the establishment is closed due to a spill, medical emergency, maintenance, or other such reasons.

In some embodiments device 4 uses GPS signal to assess user A's location, in other embodiments cell phone towers are used to triangulate user A's location, and in other embodiments a combination of GPS and cell tower triangulation are used. In other embodiments device 4 uses an image-capturing device to detect markers (49 and 50) placed around the establishment in order to assess the location of user A. As seen in FIG. 5c, in some embodiments the internal markers are signs or other markers already present in the establishment, for example, the aisle 1 label (49). In other embodiments new markers are specifically added around the store in order to aid in the location of user A are used, for example barcode 50, which is added below the aisle 1 sign. These markers are detected by the image capturing device on device 4 as a means of identifying the location of device 4 in the establishment. In other embodiments a combination of GPS, cell tower triangulation, and internal establishment markers are used. For example, a user A searching for items on device 4 from their home would need to use GPS and/or cell tower triangulation to guide the user from their home to the desired establishment. However, once inside the establishment device 4 can switch to using internal establishment markers to more precisely locate user A inside of the establishment.

The different location methods are essential as different establishments will have different needs. For instance, an establishment which modifies their internal look often may prefer to use GPS or cell tower triangulation methods and identify products by a specific latitude and longitude coordinate rather than having to re-define the internal marker locations. However, more static establishments may opt to use internal markers as the primary location method as shifting products around would be easier to associate with a specific shelf location rather than a specific latitude and longitude coordinate.

In some embodiments device 4 will ask user A if they were able to successfully find the product. If unsuccessful, in some embodiments device 4 will look for other locations of the product and guide user A to that location. In other embodiments, device 4 will notify employees of the establishment of the location of user A and the issue they are having finding the device. In some embodiments this notification will be sent to the nearest employee using device 4, in other embodiments the nearest employee using device 6, and in other embodiments the notification will be sent to a specific location such as a help desk. In some embodiments if the employee or location where the notification was sent does not acknowledge the notification a second notification will be sent to a different employee or location.

After locating the product in some embodiments device 4 allows user A to purchase the item to allow user A to avoid lines at the checkout. In some embodiments after guiding user A to the product device 4 will ask user A if they found the item and if they would like to purchase the item. In other embodiments user A has the option of purchasing items within the store. In some embodiments user A uses device 4 to scan the barcode of the products they would like to purchase and in other embodiments user A uses device 4 to capture images of the products. In some embodiments user A can purchase the items using a credit card, a debit card, a bank account, store credit, or online payment methods such as PayPal. In other embodiments only a select number of these options are available.

In some embodiments which allow user A to purchase products device 4 will print a receipt for user A. In other embodiments a receipt is provided digitally. In some embodiments the digital receipt is accessed via device 4 and in other embodiments the receipt is sent to user A's contact information. In other embodiments a QR code is provided which, once scanned, shows the receipt. These embodiments are important as user A will need to prove they purchased the product(s) before leaving the store.

In some embodiments user A has the option of putting a selected product on hold at a selected establishment. This allows a user to verify that the product will be in stock when the user arrives. In some embodiments periodic reminders are sent to user A via text message, phone call, or email in order to remind user A that their item is on hold. In other embodiments user A can choose to be notified when a currently out of stock item becomes available at a selected establishment. These embodiments mark improvements over prior art as it allows the establishment to manage reservations through product location system 1.

In some embodiments when an item is reserved it the location identifier will automatically be updated to "reserved" or "on-hold" in order to ensure the product will be available for the customer. In some of these embodiments, user B will not be able to update the location of the product normally, ensuring the reserved product does not accidentally get removed from its current location. The reservation will need to be canceled or manually over-ridden in order to change the location of the product within the establishment. In other embodiments, device 4 is incorporated into a robotic unit such that when a reservation is made device 4 guides the robotic unit to the location of the reserved item which can then be automatically removed from the location and placed in a separate "reserved" location within the establishment.

In some embodiments the functionalities of device 4 and device 6 are contained in the same device and in other embodiments these devices are two separate devices. Having separate embodiments is beneficial as each device can be optimized for their specific purpose, for instance having a highly sensitive barcode scanner for device 6 which would not be as necessary for the main functionalities of device 4. However, having the functionality of both devices 4 and 6 on a single device reduces the number of separate devices that have to be purchased and configured.

In some embodiments updates to the software are completed when released and in other embodiments updates are only completed during a specified time. Embodiments with updates which happen upon release are important for having the most up to date software and security features. However, some clients may want the updates to happen after the establishment is closed to avoid any down time for product location system 1, which is when embodiments which install updates during a specific time are useful. In some embodiments where data server 2 operates separately from devices 4 and 6, such as with the stateless RESTful systems, the updates to each unit have the option of being installed at different time points.

As mentioned above, in some embodiments device 4 recommends products. In some embodiments where user A signs into the device these recommendations are based off of past purchases and searches. In other embodiments where user A does not sign in these recommendations are based off of geographical, seasonal, specialty items, current sales, or other such considerations. In some embodiments the recommendations are done via a home page when device 4 is initially activated and in other embodiments the recommendations are listed while searching for other items. In other embodiments the product results are ranked based on recommendation data.

These embodiments are important as they help the owner of the establishment best market to the individual user A. For instance, a user A who always purchases work or dress boots is probably not interested in western style boots; thus, when searching for new boots, those results could be filtered to the bottom, showing the importance of the product result ranking embodiments based off of a customer's previous habits. Similarly, a customer in Massachusetts during the month of January is likely not going to be interested in swimsuits, so a home page would be more effective if it showed new winter coats, which shows the importance of home page recommendations based off of a generic customer's geographic location.

In some embodiments the default language is English. In other embodiments the default language can be set by the user. In other embodiments the language can be changed by the user.

These descriptions and drawings are exemplary of specific embodiments only and are not intended to be limiting to the scope of the invention defined in the claims.

What is claimed is:

1. A system for locating products in an establishment, comprising:
   a plurality of shoe pairs;
   wherein each shoe pair comprises a shoe barcode;
   wherein each shoe pair comprises a plurality of parameters;
   wherein said plurality of parameters are selected from the group consisting of size, style, color, type, and combinations thereof;
   a data server for storing said plurality of parameters for said plurality of shoe pairs;
   a plurality of locations within said establishment;
   wherein each location comprises a location barcode;
   a location updating device that communicates with said data server and correlates said shoe barcode on each of said plurality of shoe pairs with said location barcode of said location of each shoe pair; and
   a searching device that accepts user parameters, communicates with said data server, and provides a search result to a user of a searching device;
   said searching device for scanning said location barcodes to discover the location of said searching device within said establishment;
   wherein said search result comprises shoe pairs which have at least one parameter that matches said user parameters entered by a user of said searching device;
   said location barcodes for directing said user from said searching device location within said establishment to a location of a shoe pair corresponding to said search result.

2. The system of claim 1 wherein said search result comprises location information within said establishment for each shoe pair in said search result based on said location barcode.

3. The system of claim 2 wherein said searching device further provides a map of said establishment which shows said location of each selected shoe pair in said search result.

4. The system of claim 2 wherein said searching device further guides said user of said searching device to said location of each selected shoe pair in said search result.

5. The system of claim 1 wherein said searching device provides a variety of step-wise filters which said user of said searching device selects in order to identify the shoe pair for which said user of said searching device is searching.

6. The system of claim 5 wherein said searching device further provides a general search bar where said user of said searching device enters search terms which describe the shoe pair for which said user of said searching device is searching.

7. The system of claim 1 wherein said user purchases said shoe pairs through said searching device and wherein said searching device provides a receipt of said purchase.

8. The system of claim 1 wherein said location updating device and said searching device are a combined in a single device.

9. The system of claim 1 wherein said communication between said data server, said location updating device, and said searching device uses stateless architecture.

10. The system of claim 1 wherein said user reserves said shoe pair, which is either currently located at or will in the future be located at said establishment, from said establishment via said searching device, and wherein said attribute denoting said location within said establishment of said product automatically is updated to reflect said reservation.

11. The system of claim 1 wherein said searching device requires said user of said searching device to sign-in before accessing said searching device's functionality, and wherein the searches of said signed-in user of said searching device and the purchase history for said user of said searching device are stored.

12. The system of claim 1 wherein said data server comprises two components, a first component for temporary storage of said product information for said plurality of products and a second component for long term storage of said product information for said plurality of products.

13. A method for locating products in an establishment comprising:
   providing a plurality of products;
   wherein each of said plurality of products each comprises an identifier;
   wherein said identifier is a barcode;
   providing a database for storing product information for said plurality of products within said establishment;
   providing a location barcode on each location in said establishment which is correlated to said location information;
   using a location updating device to correlate said identifier on each of said plurality of products with said location barcode;
   using a searching device to find a product which provides a search result to the user of said searching device;
   providing the location information within said establishment for each product in said search result;
   using said searching device to scan said location barcodes to discover the location of said searching device within said establishment and;
   using said location barcodes to direct said user from said searching device location within said establishment to said location of said product.

14. The method of claim 13 wherein correlating an identifier on each of said plurality of products with a location barcode involves scanning said barcode on each of said plurality of products and scanning said location barcode.

15. A system for locating products in an establishment comprising:
- a data server for storing product information for a plurality of products within said establishment;
- a variety of locations within said establishment which each comprise a unique identifier:
- a location updating device that communicates with said data server and correlates an identifier on each of said plurality of products with said unique identifier denoting a specific establishment location; and
- a searching device that accepts user parameters, communicates with said data server, and provides a search result to a user of said searching device;
- wherein said search result comprises products whose product information matches said parameters entered by said user of said searching device;
- wherein said parameters consist of a variety of filters which said user of said searching device selects in order to identify the product for which said user of said searching device is searching;
- wherein said search result comprises the location information within said establishment for each product in said search result;
- wherein said searching device further comprises a camera which identifies said unique identifiers around said camera in order to find the location of said searching device; and
- wherein once said location of said searching device is ascertained, said searching device directs said user to a product selected from said search result by identifying said unique identifiers around said camera as said user moves about said establishment.

16. The system of claim 15 wherein said searching device sends a list of selected products from said search results with said location information within said establishment to said user of said searching device via a method consisting of printing said search results, emailing said search results, texting said search results, and combinations thereof.

17. The system of claim 15 wherein said communication between said data server, said location updating device, and said searching device uses stateless architecture and JavaScript Object Notation Web Token medium.

18. The system of claim 15 wherein said establishment location is a specific cabinet on a specific row in a specific aisle.

19. The system of claim 15, further comprising
- a plurality of products, namely shoes;
- wherein said plurality of products each comprise a plurality of parameters.

20. The new system of claim 19, wherein said plurality of parameters are selected from the group consisting of size, style, color, type and combinations thereof.

21. A system for locating products in an establishment, comprising:
- a plurality of shoe pairs;
- wherein each shoe pair comprises a shoe barcode;
- wherein each shoe pair comprises a plurality of parameters;
- wherein said plurality of parameters are selected from the group consisting of size, style, color, type, and combinations thereof;
- a data server for storing said plurality of parameters for said plurality of shoe pairs;
- a plurality of locations within said establishment;
- wherein each location comprises a location barcode;
- a location updating device that communicates with said data server and correlates said shoe barcode on each of said plurality of shoe pairs with said location barcode of said location of each shoe pair; and
- a searching device that accepts user parameters, communicates with said data server, and provides a search result to a user of a searching device;
- wherein said search result comprises shoe pairs which have at least one parameter that matches said user parameters entered by a user of said searching device;
- wherein said searching device further comprises a camera which identifies said location barcodes around said camera in order to find the location of said searching device; and
- wherein said location of said searching device is ascertained, said searching device directs said user to a product selected from search result by identifying said location barcodes around said camera as said user moves about said establishment.

* * * * *